(12) United States Patent
Haepp et al.

(10) Patent No.: US 8,979,385 B2
(45) Date of Patent: Mar. 17, 2015

(54) LABYRINTH SEAL OF A RADIAL ROLLING CONTACT BEARING HAVING A RADIAL FLANGE

(75) Inventors: Alexander Haepp, Hofheim (DE); Wilhelm Walter, Hambach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/985,090

(22) PCT Filed: Nov. 15, 2011

(86) PCT No.: PCT/EP2011/070146
§ 371 (c)(1),
(2), (4) Date: Aug. 13, 2013

(87) PCT Pub. No.: WO2012/107118
PCT Pub. Date: Aug. 16, 2012

(65) Prior Publication Data
US 2014/0003753 A1    Jan. 2, 2014

(30) Foreign Application Priority Data
Feb. 7, 2011  (DE) .......................... 10 2011 003 704

(51) Int. Cl.
  *F16C 33/80*  (2006.01)
  *F16C 33/78*  (2006.01)
  *F16C 33/58*  (2006.01)

(52) U.S. Cl.
CPC ............. *F16C 33/80* (2013.01); *F16C 33/7886* (2013.01); *F16C 33/805* (2013.01); *F16C 33/586* (2013.01); *F16C 2326/02* (2013.01)

USPC .......................... 384/480; 384/544; 384/488

(58) Field of Classification Search
USPC .......................... 384/480, 488, 544, 484–486
See application file for complete search history.

(56) References Cited

U.S. PATENT DOCUMENTS

| | | | |
|---|---|---|---|
| 7,624,989 B2 | 12/2009 | Hartmann et al. | |
| 8,240,674 B2 | 8/2012 | Hartmann et al. | |
| 2011/0148182 A1 | 6/2011 | Walter et al. | |
| 2012/0177315 A1 | 7/2012 | Matsuki et al. | |
| 2014/0037239 A1* | 2/2014 | Duch et al. ................... | 384/480 |

FOREIGN PATENT DOCUMENTS

| | | |
|---|---|---|
| DE | 9203402 U1 | 4/1992 |
| DE | 10358876 A1 | 7/2005 |
| DE | 102008038682 A1 | 2/2010 |
| EP | 1770296 A1 | 4/2007 |

(Continued)

*Primary Examiner* — Thomas R. Hannon
(74) *Attorney, Agent, or Firm* — Davidson, Davidson & Kappel, LLC

(57) ABSTRACT

A seal assembly for sealing a radial rolling contact bearing, having a first sealing ring and a second sealing ring, wherein the two sealing rings can be rotated relative to each other about a common axis of rotation and together form a labyrinth seal, wherein a sealing gap of the labyrinth seal that extends substantially radially with respect to the axis of rotation is covered radially by an axial projection of the second sealing ring, and the sealing gap at the axial projection opens axially into a first catch channel of the first sealing ring. A hub of the radial rolling contact bearing forms the second sealing ring. Therefore, the second sealing ring is integrated into the hub flange, which means that the hub flange performs the function of the second sealing ring and to some extent helps to form the labyrinth seal.

19 Claims, 1 Drawing Sheet

(56) References Cited

FOREIGN PATENT DOCUMENTS

| | | |
|---|---|---|
| FR | 2688567 A1 | 9/1993 |
| JP | S6210103 U | 1/1987 |
| JP | 2003240003 A | 8/2003 |
| JP | 2009222183 A | 10/2009 |
| JP | 2010060126 A * | 3/2010 |
| JP | 2010065800 A | 3/2010 |
| WO | WO 2011037183 A1 | 3/2011 |

* cited by examiner

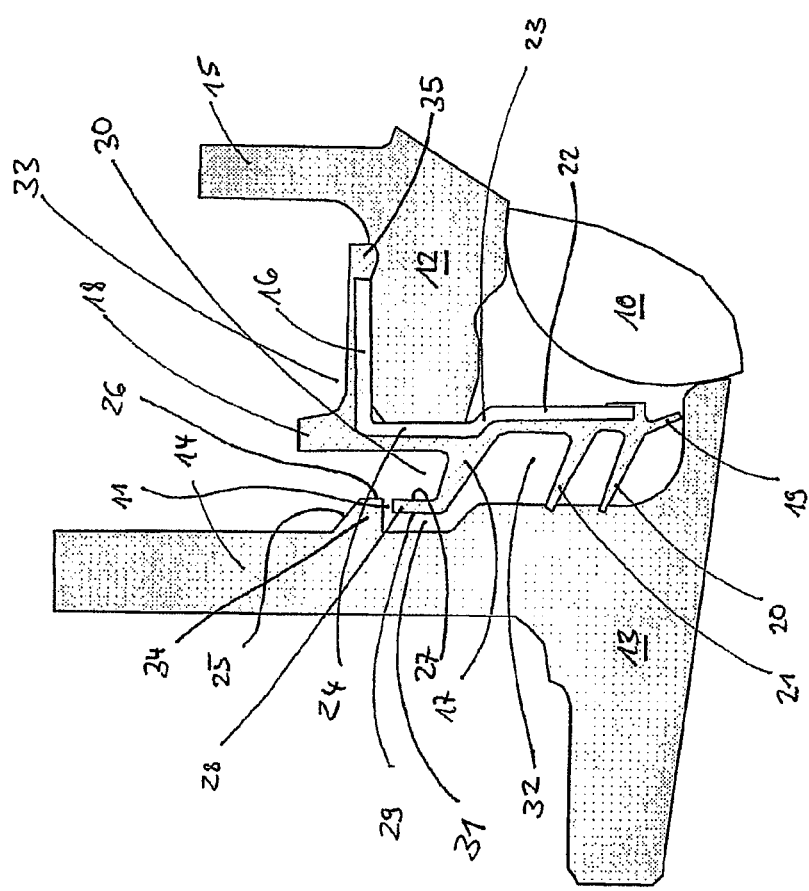

LABYRINTH SEAL OF A RADIAL ROLLING CONTACT BEARING HAVING A RADIAL FLANGE

The invention relates to a first sealing ring and a second sealing ring, both sealing rings being able to be rotated relative to each other about a common rotation axis and together forming a labyrinth seal, a labyrinth seal sealing gap which extends substantially radially relative to the rotation axis being radially covered by an axial projection of the second sealing ring and the sealing gap at the axial projection opening axially in a first catch groove of the first sealing ring. Furthermore, the invention relates to a radial rolling contact bearing having such a sealing arrangement.

BACKGROUND

Such sealing arrangements are typically used in radial rolling contact bearings, in particular wheel bearings, and are always required when two radially opposed rolling contact bearing components which can be moved relative to each other have to be sealed.

It is problematic that both sealing rings cannot be pressed together in a simple manner in the rolling contact bearing space and therefore require two separate assembly steps. It is further costly, owing to the complex shapings, to produce such sealing rings from rolling contact bearing steel or to integrate the sealing rings in the rolling contact bearing rings. Therefore, component integration in order to reduce the great variety of components in radial bearings is not possible.

DE 103 58 876 A1 discloses a sealing arrangement for wheel bearings, which is arranged by means of two sealing rings in an axial opening between the two components of the wheel bearing that can be rotated relative to each other and which axially seals the wheel bearing. To this end, the two sealing rings form a gap labyrinth, which has a catch groove with an axially opening and radially extending sealing gap.

SUMMARY OF THE INVENTION

It is an object of the invention to provide a sealing arrangement which has a small number of components, achieves a good sealing effect with a low friction coefficient and nonetheless enables simple assembly.

The present invention provides a sealing arrangement of the type mentioned in the introduction in that a hub of the radial rolling contact bearing forms the second sealing ring. The second sealing ring which is integrated in the side of the radial flange of the hub facing the radial bearing also partially forms the labyrinth seal and can optionally form surfaces for sliding sealing contact. In this manner, the second sealing ring in the form of a second component may be dispensed with and therefore does not have to be installed separately. Furthermore, there is substantially more structural space available which can be used either for the arrangement of axial or radial sealing lips or for a reinforcement of the radial flange.

The labyrinth seal sealing gap which extends substantially radially relative to the rotation axis extends axially past the first catch groove in order to ensure an axial opening (in contrast to a radial opening) in the first catch groove. It is important for the catch groove to be connected by means of the sealing gap to a sealing space which is arranged radially inward with respect to the first catch groove. To this end, the sealing gap may also extend axially in regions or have both an axial and a radial component.

It is advantageous for the sealing gap to extend from a sealing space, for example, of a second catch groove, to taper axially outward in a radial direction and to extend further outward between the radial flange and the first catch groove.

The sealing gap is further radially covered by an axial projection of the second sealing ring and opens at the axial projection axially into a first catch groove of the first sealing ring. The opening is remote in a radially outward manner from the base of the first catch groove, whereby water can flow in a peripheral direction along the base of the first catch groove and drain away radially owing to gravitational force.

Advantageously, the axial projection is annular and constructed as an axial continuation of the hub flange, in particular wheel flange. Its radial outer face radially centrifuges dirty water away during operation of the bearing. This can be promoted by means of the formation of the outer face as a conical or elliptical outer face. Consequently, when the bearing is stationary, it is also ensured that dirty water can flow from the projection into the first catch groove and can consequently flow away.

Advantageously, the first catch groove is axially delimited by an annular delimitation element. This consequently results in an axially narrower construction since the sealing gap can be directed radially straight outward, and is axially delimited at both sides directly by the hub flange and the delimitation element. Ideally, the annular delimitation element forms, together with the hub flange, the sealing gap which extends substantially radially relative to the rotation axis.

In a preferred embodiment, the annular delimitation element is constructed in the manner of a disk. Consequently, the narrow construction possibility of the sealing gap is produced and at the same time a flat inner face of the first catch groove which allows water also to drain away via the opening of the axial opening and prevents penetration of water into the sealing space which follows the sealing gap. Another advantage is achieved here if the first catch groove is not delimited or covered in a radially outward direction in order to ensure unimpeded drainage.

In a preferred embodiment, the inner face of the first catch groove is arranged on the delimitation element substantially in the same radial plane as an axial end face of the axial projection. The drainage of the water is also ideally promoted thereby. An axial variation of the two faces could typically be at a production tolerance of approximately ±0.1 millimeter. A discrepancy within this tolerance is small enough to prevent water from entering the sealing space.

In addition, in an alternative embodiment, there may be provided an axial offset of the end face and the inner face, which offset may be larger than the production tolerance. Consequently, it is possible to take into account fluid-dynamic properties of the bearing or the sealing arrangement which can arise owing to a specific construction of the hub flange or the first sealing ring or another radial bearing component. For example, with different dimensions of the catch groove, different fluid-dynamic distributions within the catch groove may occur so that an intentional axial offset has a positive effect on the sealing action of the opening. Such an axial offset between the end face of the axial projection and the inner face of the catch groove could be between −0.5 and +0.5 millimeter, in particular +0.2 or −0.2, the inner face being optionally axially offset in a flange direction with respect to the end face, or being axially offset in the opposite direction with respect to the rolling contact bearing.

In an advantageous embodiment, the first sealing ring has a retention element and a resilient member which is secured to the retention element and which forms at least one sealing lip. Either a radial or an axial outer face of the hub ensures a sliding sealing contact.

In an advantageous embodiment, the resilient member forms at least one axial sealing lip which forms a sliding sealing contact with the hub flange. To this end, a retention element is provided and is secured to an outer ring, for example, by means of a securing element, and produces a pretensioning with respect to the hub flange.

For example, the resilient member, which can be formed from an elastomer, may form at least one radial sealing lip which forms a sliding sealing contact with the hub which forms the hub flange. Sealing lips of this type have a high level of friction, but also produce a very good sealing effect. Consequently, the radial sealing lip can be used with a high level of contamination, levels of sealing efficiency being able to be achieved which far exceed the efficiency levels of conventional sealing arrangements without any catch grooves.

In an advantageous embodiment, the first catch groove is formed at least partially by means of the resilient member of the first sealing ring. The catch groove may, for example, be produced completely from sheet metal or partially comprise the resilient member. In particular, the delimitation element can be formed from the resilient member, whereby the formation of the catch groove is simplified. Furthermore, the delimitation element may be formed integrally with at least one sealing lip, whereby both can be produced in the same operating step.

The sealing arrangement according to the invention can be used in radial rolling contact bearings, in particular in wheel bearings, but is not limited to bearings of this type.

Other advantageous embodiments and preferred developments of the invention may be taken from the description of the Figures and/or the dependent claims.

The invention is described and explained in greater detail below with reference to the embodiment illustrated in the Figures.

BRIEF DESCRIPTION OF THE DRAWING

FIG. 1 shows a wheel-flange-side sealing arrangement for sealing a wheel bearing.

DETAILED DESCRIPTION

FIG. 1 shows a wheel-flange-side sealing arrangement for sealing a wheel bearing, whose wheel hub 13, outer ring 12 and roller member 10 are only partially illustrated. It is, for example, a wheel bearing unit, which can be secured to a wheel carrier with the flange 15 and which has a wheel flange 14 for securing a wheel rim.

The first sealing ring 24 is secured to an outer ring by means of a cylindrical securing element 16. The second sealing ring known from the prior art is not present as a separate component. Instead, the wheel flange 14 of the wheel hub 13 has taken over the functions thereof.

The radial continuation 18 of the resilient member 17 forms, together with the securing flange 15 of the wheel bearing, a radially outwardly positioned third catch groove 33. The first catch groove 30 is completely formed by the resilient member 17, in this embodiment an elastomer, and the second catch groove 32 adjoins the sealing gap 31 radially at the inner side between the delimitation element 28 and the wheel flange 14. Using these catch grooves 30, 32, 33, it is possible to repel dirty water or to let it flow away in a peripheral direction and subsequently drain away. In the case of the third catch groove 30, the end of the securing element 16 is provided with a static seal in the form of a beading in order to prevent the infiltration of water between the outer ring 12 and securing element 16.

On the one hand, the sealing ring 24 comprises the resilient member 17, which forms all the other resilient elements 18, 19, 20, 21, 28, 35. The disk-like retention element 22 and the securing element 16, on the other hand, are formed from cold-formed sheet metal, the resilient member 17 having been vulcanized in order to form the axial sealing lips 20, 21 and the radial sealing lip 19. In the same manner, the resilient member 17 forms the first catch groove 30, the static seal 35 and the radial continuation 18.

Alternatively, a plurality of resilient members may be provided. For example, two resilient members could be provided, the first forming the static seal 35 and the second forming the sealing lips 20, 21, 19. The catch groove 30 and the radial continuation 18 can also be produced from partially doubled sheet metal.

Regardless of how many resilient members are provided, a different number of sealing lips may be formed on at least one of the resilient members. For example, it is conceivable to dispense with the radial sealing lip 19 and to provide one or two axial sealing lips 20, 21 which are in sliding abutment with the hub flange 14. This can be achieved since, owing to the presealing which is constructed as a labyrinth seal, a high level of sealing is already achieved and the omission can be tolerated or even improves the friction coefficient of the bearing. The omission of the axial sealing lips 20, 21 is also conceivable if the radial sealing lip 19 is provided.

Alternatively, the sealing lips 19, 20, 21 as a labyrinth seal may each form a gap seal, for example, by the respective sealing lip being shortened in such a manner that it is no longer in abutment, but instead has a spacing with respect to the hub. The smaller the spacing, the greater the sealing action. To this end, one or more of the sealing lips mentioned can be shortened in the manner described.

In order to further improve the sealing properties, water-resistant lubricant, such as, for example, grease, may be introduced between the sealing lips 20, 21. Consequently, in particular the internal sealing lip 20 can be protected very effectively from foreign bodies and consequently from abrasion.

The axial gap opening 11 between the axial projection and the delimitation element 28 can be kept so small that, owing to the gravitational force or the centrifugal force, water droplets can be radially transferred from an inner face 27 at the axial inner side of the first catch groove 30 onto the axial end face 26, or vice versa, without reaching the gap opening 11. Even if this were to happen, although the water would reach the second catch groove 32, it could also extensively drain away at that location and leave the sealing space again through the sealing gap 31 and the gap opening 11. First catch groove 30 also includes an outer face 29 on delimitation element 28.

When the wheel bearing is operated, the conical face 25 directs the dirty water onto the radial flange and from there in a radially outward direction. In the stationary state, the water drops into the first catch groove 30 and is directed in a downward direction. The directing action can be promoted by the inner face 27 and the axial end face 26 being located where possible in a radial plane so that water can flow away in both radial directions (outward and inward). To this end, the axial projection 34 is intended to radially surround not only the sealing gap 31, but also the delimitation element 28. Optionally, the face 25 may also alternatively be constructed so as to be round, that is to say, be constructed with a radius of curvature.

Furthermore, more axial structural space can be obtained for the axial sealing lips 20, 21 by means of a bent portion 23.

In summary, the invention relates to a sealing arrangement for sealing a radial rolling contact bearing having a first sealing ring and a second sealing ring, both sealing rings being able to be rotated relative to each other about a common rotation axis and together forming a labyrinth seal, a labyrinth seal sealing gap which extends substantially radially relative to the rotation axis being radially covered by an axial projection of the second sealing ring and the sealing gap at the axial projection axially opening in a first catch groove of the first sealing ring. With the objective of providing a sealing arrangement which has a small number of components, achieves a good sealing effect with a low friction coefficient and nonetheless enables simple assembly, it is proposed that a hub of the radial rolling contact bearing forms the second sealing ring. Consequently, the second sealing ring is integrated in the hub flange, whereby the hub flange assumes the function of the second sealing ring and partially also forms the labyrinth seal.

LIST OF REFERENCE NUMERALS

10 Roller member
11 Gap opening
12 Outer ring
13 Wheel hub
14 Wheel hub flange
15 Securing flange
16 Securing element
17 Resilient member
18 Radial continuation
19 Axial sealing lip
20 Axial sealing lip
21 Axial sealing lip
22 Retention element
23 Bent portion
24 First sealing ring
25 Conical outer face
26 Axial end face
27 Inner face
28 Delimitation element
29 Outer face
30 First catch groove
31 Sealing gap
32 Second catch groove
33 Third catch groove
34 Axial projection
35 Static seal

The invention claimed is:

1. A sealing arrangement for sealing a radial rolling contact bearing comprising:
  a first sealing ring and a second sealing ring, the first and second sealing rings rotatable relative to each other about a common rotation axis and together forming a labyrinth seal, a labyrinth seal sealing gap extending substantially radially relative to the rotation axis being radially covered by an axial projection of the second sealing ring and the sealing gap at the axial projection opening axially in a first catch groove of the first sealing ring, a hub of the radial rolling contact bearing forming the second sealing ring,
  the first catch groove being axially delimited by a radially extending annular delimitation element of the first sealing ring on a first axial side of the first catch groove adjacent to the second sealing ring,
  the first catch groove being axially delimited by another radially extending portion of the first sealing ring on a second axial side of the first catch groove opposite the first axial side.

2. The sealing arrangement as recited in claim 1 wherein the annular delimitation element forms, together with a hub flange of the hub, the sealing gap which extends substantially radially relative to the rotation axis.

3. The sealing arrangement as recited in claim 1 wherein the annular delimitation element is a disk.

4. The sealing arrangement as recited in claim 1 wherein an inner face of the first catch groove is arranged on the delimitation element substantially in the same radial plane as an axial end face of the axial projection.

5. The sealing arrangement as recited in claim 1 wherein the first sealing ring has a retention element and a resilient member secured to the retention element and forming at least one sealing lip.

6. The sealing arrangement as recited in claim 5 wherein the resilient member forms at least one axial sealing lip of the at least one sealing lip, the axial sealing lip forming a sliding sealing contact with a hub flange of the hub.

7. The sealing arrangement as recited in claim 5 wherein the resilient member forms at least one radial sealing lip of the at least one sealing lip, the radial sealing lip forming a sliding sealing contact with the hub.

8. The sealing arrangement as recited in claim 5 wherein the first catch groove is formed at least partially by the resilient member of the first sealing ring.

9. A radial rolling contact bearing comprising the sealing arrangement as recited in claim 1.

10. A wheel bearing comprising the sealing arrangement as recited in claim 1.

11. A sealing arrangement for sealing a radial rolling contact bearing comprising:
  a first sealing ring and a second sealing ring, the first and second sealing rings rotatable relative to each other about a common rotation axis and together forming a labyrinth seal, a labyrinth seal sealing gap extending substantially radially relative to the rotation axis being radially covered by an axial projection of the second sealing ring and the sealing gap at the axial projection opening axially in a first catch groove of the first sealing ring, a hub of the radial rolling contact bearing forming the second sealing ring,
  wherein the first catch groove is axially delimited by an annular delimitation element,
  wherein an inner face of the first catch groove is arranged on the delimitation element substantially in the same radial plane as an axial end face of the axial projection.

12. The sealing arrangement as recited in claim 11 wherein the annular delimitation element forms, together with a hub flange of the hub, the sealing gap which extends substantially radially relative to the rotation axis.

13. The sealing arrangement as recited in claim 12 wherein the annular delimitation element is a disk.

14. The sealing arrangement as recited in claim 11 wherein the first sealing ring has a retention element and a resilient member secured to the retention element and forming at least one sealing lip.

15. The sealing arrangement as recited in claim 14 wherein the resilient member forms at least one axial sealing lip of the at least one sealing lip, the axial sealing lip forming a sliding sealing contact with a hub flange of the hub.

16. The sealing arrangement as recited in claim 14 wherein the resilient member forms at least one radial sealing lip of the at least one sealing lip, the radial sealing lip forming a sliding sealing contact with the hub.

17. The sealing arrangement as recited in claim 14 wherein the first catch groove is formed at least partially by the resilient member of the first sealing ring.

18. A radial rolling contact bearing comprising the sealing arrangement as recited in claim 11.

19. A wheel bearing comprising the sealing arrangement as recited in claim 11.

* * * * *